United States Patent Office 3,674,340
Patented July 4, 1972

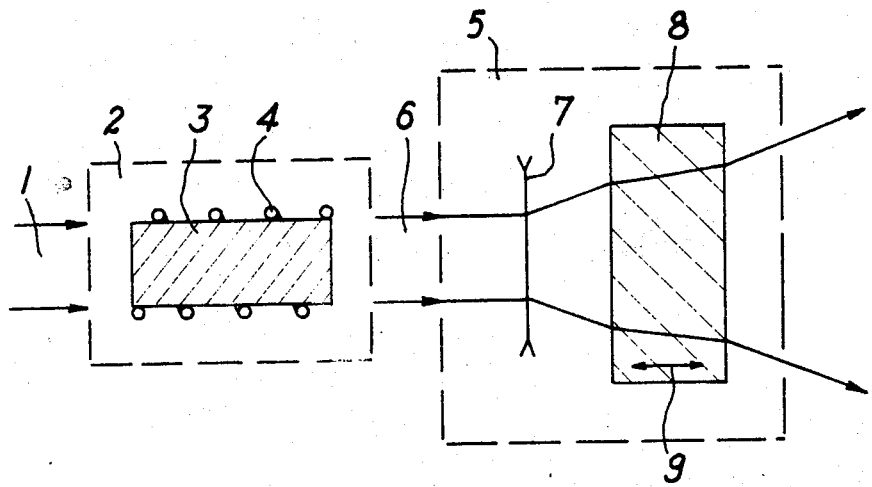

3,674,340
DEVICE FOR IMPROVING THE OPTICAL QUALITIES OF A LASER BEAM
Louis Jacob, Saint-Germain-les-Arpajon, France, assignor to Commissariat a l'Energie Atomique, Paris, France
Filed Jan. 26, 1971, Ser. No. 109,784
Claims priority, application France, Feb. 10, 1970, 7004668
Int. Cl. C02f 1/24
U.S. Cl. 350—157                                                    4 Claims

ABSTRACT OF THE DISCLOSURE

An optical system centered on a substantially parallel light beam produced by a laser is capable of transforming said beam into a beam of light rays having different angles of inclination to the optical axis. A birefringent optical element is centered on the output beam of the optical system and serves to produce between the two perpendicular components of a luminous vibration associated with one of the light rays a phase shift having a value which is a function of the angle of incidence of the light ray on the birefringent element.

---

This invention relates to a device for improving the optical qualities of a laser beam.

The quality of a laser beam is understood to refer to properties such as geometrical divergence of the beam, intensity of the luminous flux carried by the beam, the characteristics of the wave surface associated with the beam (e.g. the values of spherical aberrations, of coma, of astigmatism or of distortion which characterize the defects of the wave surface with respect to a perfect wave surface), the spatial coherence of the different points of the wave surface, polarization and so forth.

The optical qualities of a light beam produced by a laser are not always satisfactory and have to be improved in some applications. In laser telemetry, for example, the light beam must accordingly have a very small angle of divergence; in the case of holography or laser interferometry, the length of coherence must be substantial and the wave surface of the light beam must be free from aberration; in the case of plasma diagnosis, the state of the wave surface is important but it is also desirable to ensure that polarization of the light rays should be substantially identical at each point of the light-beam cross-section.

In the case of gas lasers, the gaseous active medium is contained in an envelope which is usually a glass tube. A large number of excited gas atoms located at the periphery of the active medium come into collision with the envelope wall, are de-excited and a not-negligible quantity of energy is lost as a result of these collisions. This gives rise to lack of homogeneity in polarization of the light rays and the energy density is not uniformly distributed along a transverse cross-section of the light beam which is produced by lasers of this type.

The population inversion of a solid or liquid laser medium is usually obtained by optical pumping with the flash emitted by one or a number of discharge lamps disposed around the active medium. This mode of pumping gives rise to thermal stresses at the periphery of the pumped medium, thus in turn resulting in a variation in optical index in the medium and induced birefringence. It is then found that the laser beam which is emitted is substantially divergent, that its wave surface exhibits a number of different aberrations and that the polarization of the different light rays which constitute the emergent beam is not uniform.

The invention provides a device which meets practical requirements more effectively than comparable devices of the prior art, particularly by virtue of the fact that the basic design concept and construction of the device are very simple and that it is convenient to use. The primary object of the invention is to obtain a device which makes it possible to improve the optical qualities of a laser beam and more particularly the wave surface of the beam, the uniform polarization of the different constituent light rays and the homogeneity in energy density of the beam at each point.

To this end, the invention proposes a device for improving the optical qualities of a substantially parallel light beam produced by a laser, wherein said device comprises successively an optical system which is centered on said light beam and capable of transforming said substantially parallel beam into a beam of light rays having different angles of inclination to said optical axis and a birefringent optical element which is centered on the output beam of said optical system and serves to produce between the two perpendicular components of a luminous vibration associated with one of said light rays a phase shift having a value which is a function of the angle of incidence of said ray on said birefringent element.

A clearer understanding of the invention will be gained from the following description of one mode of execution of the invention which is given by way of example and not in any limiting sense. Reference is made in the description to the accompanying drawings in which the single figure represents one advantageous embodiment of the invention as adapted more particularly to the improvement of the optical qualities of a light beam issuing from a solid-state laser.

In the single figure, a substantially parallel and polarized light beam 1 produced by a laser generator penetrates into an amplifier 2 consisting of a solid active medium 3, a rod of glass doped with neodymium, for example, and optical pumping means 4 consisting of a discharge lamp. The light beam emanating from said amplifier penetrates into the device 5 in order to improve the optical qualities of said beam. In accordance with the invention, said device comprises successively an optical system 7 which is centered on the light beam 6 and a birefringerent optical element 8. The optical system 7 is a centered system which is formed by reflecting or refracting surfaces of revolution about a common optical axis and which makes it possible to transform the beam 6 derived from the amplifier 2 into a convergent or divergent beam. In the case of the single figure, the system 7 is a divergent lens and the birefringent element 8 is a uniaxial crystal plate having parallel faces and formed of quartz. The optical axis of said plate which is shown by the arrow 9 is parallel to the axis of the laser beam 6 and perpendicular to the parallel faces of the system 8.

The light beam which emerges from the amplifier 2 is substantially parallel. After passing through the divergent lens 7, said beam is divergent and the light rays which constitute the beam pass into the birefringent optical element 8 at different angles of inclination.

The birefringent element 8 produces between two perpendicular components of a luminous vibration associated with a ray of the beam a phase shift having a value which is a function of the angle of incidence of said ray on the birefringent element 8. It has been found as a result of experiments that an amplifier 2 associated with the device 5 in accordance with the invention is capable of amplifying a polarized laser beam 1 which is free from optical aberrations without affecting the polarization, the wave surface and the spatial coherence of the incident laser beam.

The optical system 7 which is a divergent lens in the case of the single figure can be a convergent lens or a spherical mirror, for example. The birefringent optical element 8 is not necessarily a plate having parallel faces and the optical axis 9 of said element 8 may not be parallel to the axis of the incident light beam. The device 5 can be placed at the end of an amplifying laser chain or associated with a laser generator or alternatively interposed between two amplifiers of an amplifying laser chain. The active medium 3 can also be a liquid or a gas.

What I claim is:

1. A device for improving the optical qualities of a substantially parallel light beam produced by a laser, comprising successively outside of the laser's cavity an optical system centered on said light beam and transforming said substantially parallel beam into a beam of light rays having different angles of inclination to the optical axis and a birefringent optical element centered on the output beam of said optical system producing between the two perpendicular components of a luminous wave associated with one of said light rays a phase shift having a value which is a function of the angle of incidence of said light ray on said birefringent element.

2. A device according to claim 1 said optical system being a lens.

3. A device according to claim 1 said birefringent optical element being a uniaxial crystal plate having parallel faces.

4. A device according to claim 3 the optical axis of said uniaxial crystal plate being perpendicular to said faces and parallel to the axis of said light beam.

References Cited

UNITED STATES PATENTS

| | | | |
|---|---|---|---|
| 3,395,961 | 8/1968 | Ready | 331—94.5 |
| 3,555,454 | 1/1971 | Myers et al. | 331—94.5 |
| 3,484,714 | 12/1969 | Koester et al. | 331—94.5 |
| 3,564,454 | 2/1971 | Hook et al. | 331—94.5 |

OTHER REFERENCES

Cirkovic et al.: "Use of Birefringent Plate to Control the Spectral Emission of Ruby Laser," App. Opt. vol. 7, No. 5 (May 1968), pp. 981–982.

DAVID SCHONBERG, Primary Examiner

P. R. MILLER, Assistant Examiner

U.S. Cl. X.R.

331—94.5; 350—147